Aug. 30, 1927.
J. M. HOWE
1,640,357
JUVENILE VEHICLE
Filed Feb. 9, 1925
5 Sheets-Sheet 2
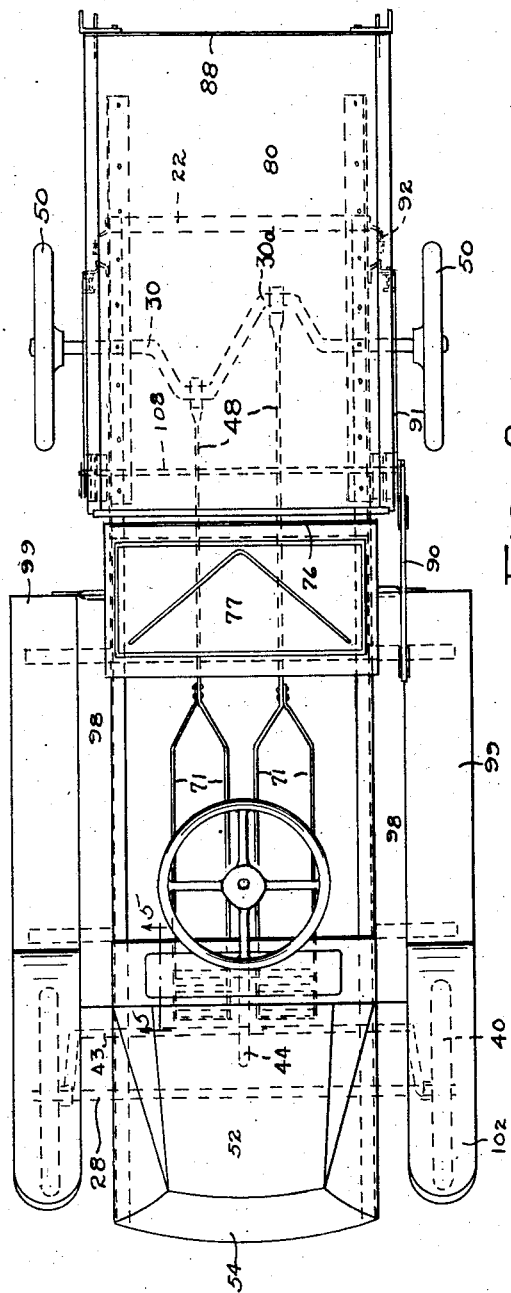
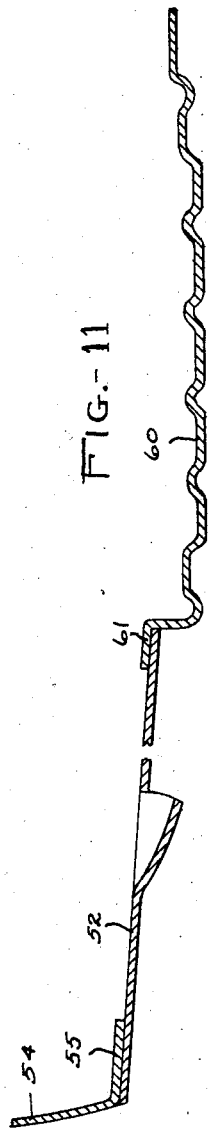
Inventor
James M. Howe
By Bates, Macklin, Goldrick & Teare
Attorneys Aug. 30, 1927.
J. M. HOWE
1,640,357
JUVENILE VEHICLE
Filed Feb. 9, 1925
5 Sheets-Sheet 3
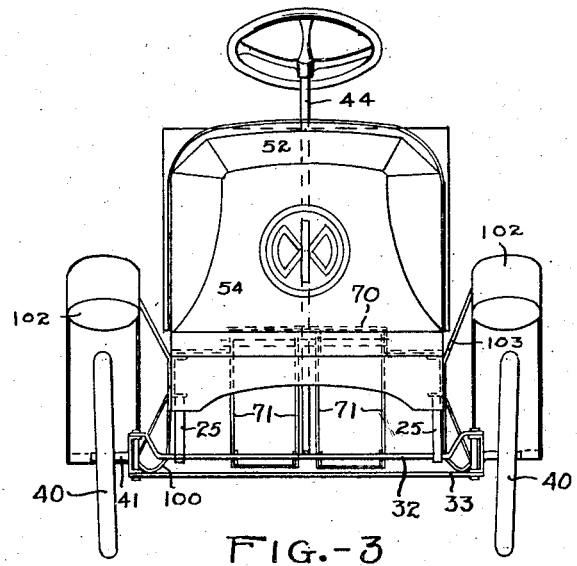
FIG.-3
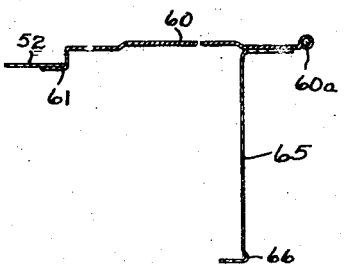
FIG.-5
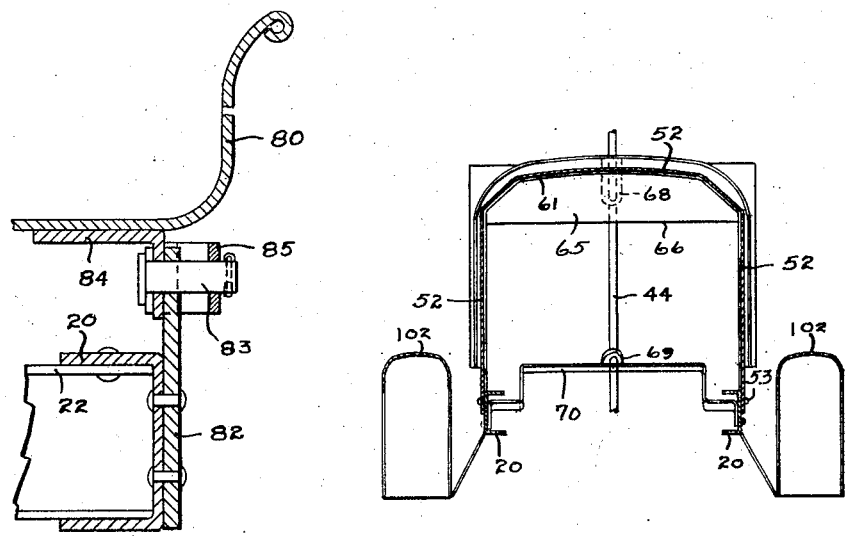
FIG.-6
FIG.-4
Inventor
James M. Howe
By Bates, Macklin, Goldrick & Teare
Attorneys Aug. 30, 1927.
J. M. HOWE
1,640,357
JUVENILE VEHICLE
Filed Feb. 9, 1925
5 Sheets-Sheet 4
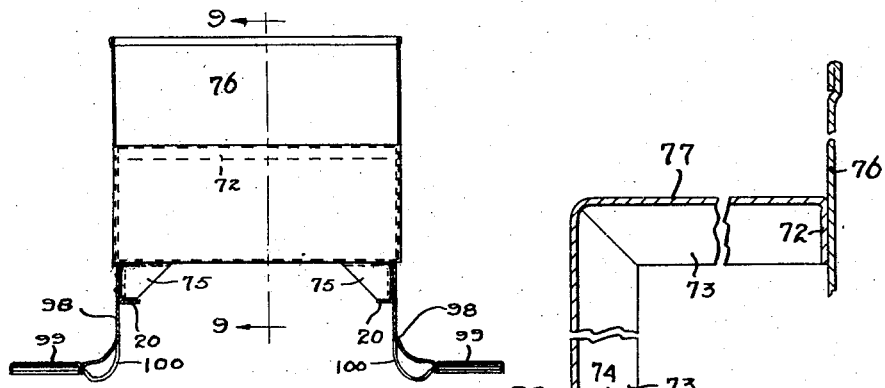
FIG.-7
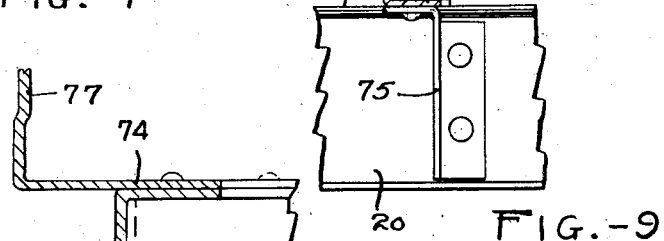
FIG.-9
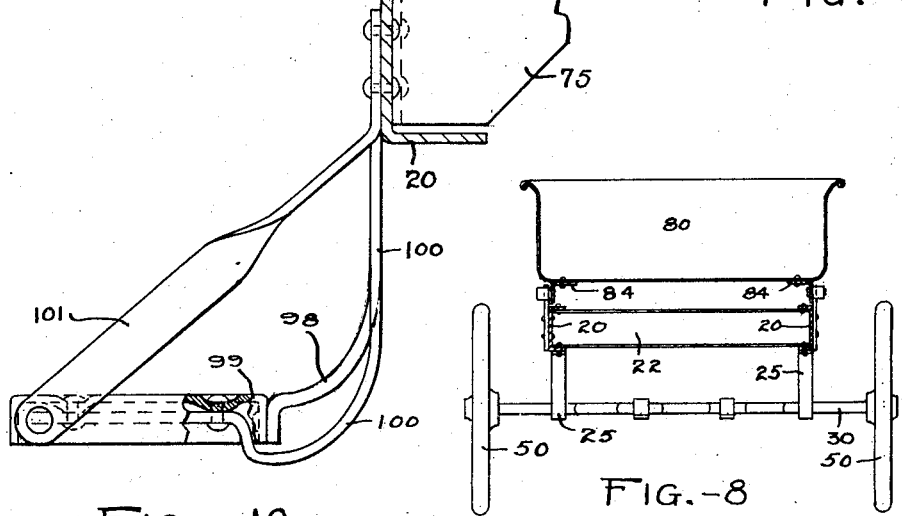
FIG.-10
FIG.-8
Inventor
James M. Howe
By Bates, Macklin, Goldrick & Teare
Attorneys

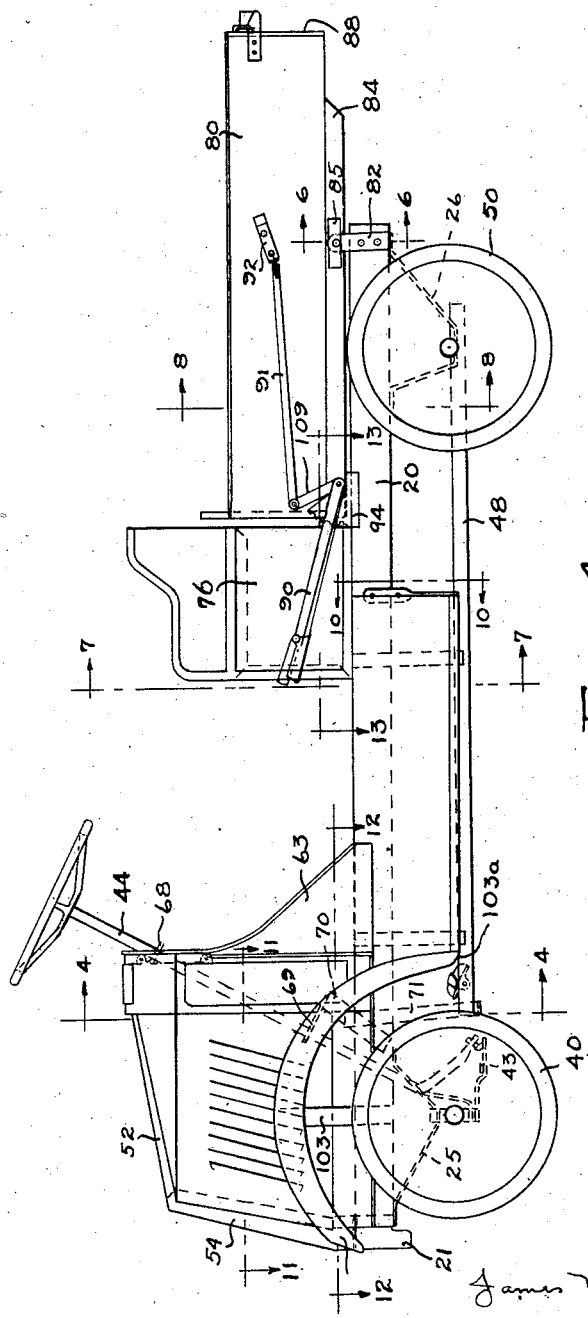

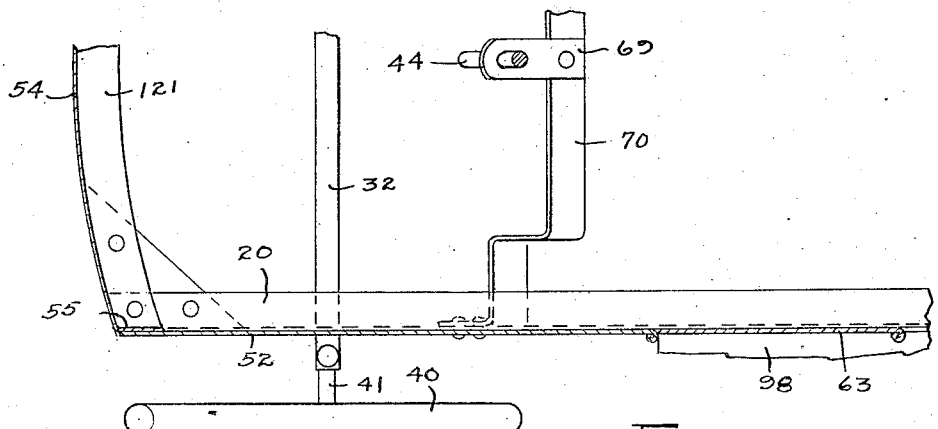
FIG.-12
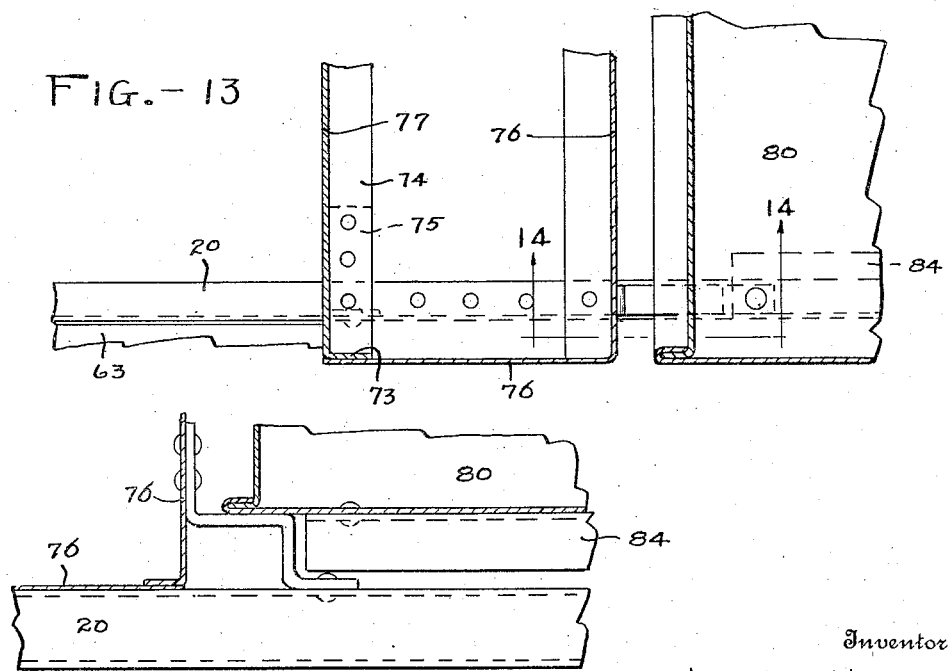
FIG.-13
FIG.-14

Patented Aug. 30, 1927.

1,640,357

UNITED STATES PATENT OFFICE.

JAMES M. HOWE, OF CLEVELAND HEIGHTS, OHIO, ASSIGNOR TO THE MURRAY PRODUCTS COMPANY, OF CLEVELAND, OHIO, A CORPORATION OF MICHIGAN.

JUVENILE VEHICLE.

Application filed February 9, 1925. Serial No. 7,842.

This invention is concerned with toy vehicles of the pedal operated type and the general object thereof is the provision of a toy vehicle constructed of pressed steel parts, the parts having a particular relationship whereby an economical but rigid body and chassis construction may be obtained.

Toy vehicles, approximating in miniature appearance the well known makes of automobiles, have become popular in the juvenile world, but the efforts of the manufacturers heretofore have been confined to the obtaining of a suggestive appearance of such automobiles in juvenile vehicles without any attention being devoted to the obtaining of a vehicle construction which would withstand the vicissitudes of juvenile use. The bodies of such toys usually comprise a wooden chassis structure having thin sheet metal body portions nailed or otherwise unsatisfactorily attached thereto and such structures are provided with gaudy imitation accessories and paint to produce an appeal to the juvenile mind. Needless to say, such toys rapidly deteriorate, thus prejudicing the efforts of more conscientious manufacturers in establishing a permanent market.

Other objects of my invention, therefore, include the provision of the formation of various parts of a juvenile toy of the character referred to, of such shape as to be assembled in a novel manner, whereby a pedal operated vehicle of light but durable and rigid construction may be obtained resembling in greater detail the large commercial car.

A more specific object is to provide a chassis construction affording a firm attachment for the axle of such a vehicle, and hood, cowl and seat structures which may be intimately associated with and constitute a part of the chassis structure, whereby the chassis structure may be transversely reinforced, thus affording a steel chassis structure for a juvenile vehicle which may have a completely open space betwen the chassis side bars and between the hood and seat structure.

Other objects of my invention will hereinafter become apparent from the following description which refers to the accompanying drawings illustrating an embodiment thereof in a juvenile vehicle comprising a miniature dump truck of the pedal operated type. The essential characteristics thereof are summarized in the claims.

In the drawings, Fig. 1 is a side elevation of a miniature dump truck of such size as to comprise a carrier for a child and which may be foot propelled by the child, preferably by driving the rear axle thereof with a pedal operated mechanism; Fig. 2 is a plan view of the vehicle; Fig. 3 is a front elevational view of the vehicle; Fig. 4 is a transverse cross-section view taken through the forward part of the vehicle substantially along the line 4—4 of Fig. 1; Fig. 5 is an enlarged fragmentary cross-sectional detail taken through the cowl structure substantially along the line 5—5 of Fig. 2; Fig. 6 is an enlarged detail of a pivotal mounting for the dump body of the truck taken substantially along the line 6—6 of Fig. 1; Fig. 7 is a transverse cross-sectional view taken along the line 7—7 of Fig. 1; Fig. 8 is a transverse cross-sectional view taken along the line 8—8 of Fig. 1; Fig. 9 is an enlarged fragmentary cross-sectional view taken substantially along the line 9—9 of Fig. 7; Fig. 10 is an enlarged cross-sectional detail taken through the splash and side runner of the vehicle substantially along the line 10—10 of Fig. 2; Fig. 11 is an enlarged cross-sectional detail taken along the line 11—11 of Fig. 1; Fig. 12 is an enlarged cross-sectional fragmentary plan taken along the line 12—12 of Fig. 1 showing the built in construction of the cowl and hood relative to the forward part of the chassis; and Fig. 13 is an enlarged fragmentary plan taken along the line 13—13 of Fig. 1 illustrating the transverse reinforcing characteristics of the seat structure relative to that part of the chassis comprising the chassis side bars and Fig. 14 is an enlarged cross-sectional detail taken substantially along the line 14—14 of Fig. 13.

As shown in the drawings, I have provided a juvenile vehicle of the pedal operated type, the general detail lines of which reproduce on a miniature scale, a well known commercial dump truck, the construction of this toy vehicle being such that it may not only constitute a means of conveyance for the juvenile user, but may also serve the purpose of the usual coaster wagon. The construction is such that the toy may be subjected to the usual juvenile abuse without impairing the utility and service ability thereof. Then entire toy is constructed of pressed steel parts formed in a particular manner to impart to the vehicle unusual rigidity and ruggedness. The vehicle parts are formed to be built into and comprise a part of the chassis structure which in the main, comprises spaced apart longitudinally extending channel shaped members 20. These channel shaped members define the body width and the forward and rearward ends thereof are respectively reinforced by transverse struts 21 and 22 as shown in Figs. 1, 2 and 8. These side members are preferably of a channel shape and formed of light sheet metal, reinforced transversely intermediate the ends thereof by a hood and cowl structure and a seat structure as will be hereinafter described.

The construction of the body and chassis is such that brackets, carrying front and rear axles may be attached directly to the chassis side members 20. Hence depending from the undersides of the chassis side bars 20 are forward axle brackets 25 and rearward axle brackets 26 respectively affording attachment for the front axle structure 28 and a rear crank axle 30. The rear axle, as shown in Fig. 8 extends over the bottom portions of the rear brackets 20, while the front brackets 25 extend over the front axle structure. The front axle may comprise spaced apart bars 32 and 33. The brackets 25 engage the upper bar 32 and auxiliary brackets 36 are provided engaging the rear legs of the brackets 25. The brackets 36 are formed to depend from the main brackets 25 and engage the lower axle bars 33.

The foregoing axle construction affords an independent steering mounting for each front wheel 40. The forward wheels 40 may therefore be mounted upon knuckles 41 which are pivotally attached to the ends of the axle bars 32 and 33. The knuckles have rearward extensions pivotally connected to a transverse paralleling bar 43 which may be attached to a steering post 44 in a well known manner. The steering post may extend upwardly to a dirigible wheel above the truck body and may be supported in a manner to be hereinafter described.

The pedal operated mechanism for driving the car may be suspended beneath the body in such position as to be concealed by the body and extend rearwardly to the rear axle.

Crank portions 30ª of the rear axle may be pivotally connected to longitudinally extending propeller bars 48 which extend forwardly beneath an opening formed by the cowl and seat structure and the chassis bars 20 and are oscillatingly suspended beneath the cowl structure, whereby, when pedals carried thereon are operated, the rear wheels 50 may be driven.

The particular manner of reinforcing the chassis structure by using the hood, cowl and seat structure while maintaining the weight of the vehicle within practical commercial limits will now be described. As shown in Figs. 4, 5, 11 and 12, the hood may comprise a single sheet metal member 52 of a tapered form to constitute the top and sides of the hood structure. The bottom portions of the sides of this member extend downwardly and overlap the side chassis members 20 and may be rigidly attached thereto by rivets 53 or any other suitable means such as spot welding. The front of the hood may comprise a flanged panel 54 with the top and side flanges 55 thereof extending beneath and rigidly secured to the front edges of the hood member 52. A bottom flange 56 thereof may be secured to the front transverse chassis strut 21, the strut 21 being flanged along the top with ends of the flange secured to the flanges of the side chassis members 20. The front strut 21 may be bow shaped to conform to the bottom margin of the front panel 52, and thus comprise a finishing panel for the lower front of the vehicle. The rear margin at edge of the hood may be rigidly attached to a cowl structure which may comprise primarily a sheet metal member of a particular beaded form to preserve the stream line appearance of the forward part of the vehicle body. Thus, a press formed member 60 may have a depressed forward flange 61 to which may be attached the inner end of the hood member 52 by riveting or spot welding. The member 60, forms the top and sides of the cowl structure, the sides of the member 60 may flare as shown at 63 in Fig. 1 to complete the finishing appearance, and for additional strength the bottom portions of this member 60 may overlap the sides of the chassis members 20 and be rigidly attached thereto. Additional reinforcing means for the cowl structure may comprise a Z-shaped transverse member 65, Fig. 5 suitably beaded as shown at 66 at the flange to afford added transverse strength. The upper leg of this Z-shaped member may terminate adjacent the beaded end 60ª of the member 60 and this beaded structure may extend completely along the exposed edge of the cowl structure. It will thus be seen that the forward end of the cowl member 60 is considerably reinforced by reason of the formation of the depressed flange 61 and the transverse panel 65 which may also be fashioned to comprise an imitation instrument board.

The member 65 may also constitute a support for a bracket 68 supporting the upper reach of the steering rod 44. The lower portion of the steering rod 44 may be supported by a perforated plate 69 carried by a transversely extending bracket 70 having the ends thereof secured to the side chassis members 20. Depending from the transverse member 70 are swingable links 71 which support the forward ends of the propeller bars 48.

The seat structure is formed of pressed metal panel members from sheet metal of light gauge suitably beaded and flanged to obtain a maximum reinforcing strength for the chassis bars 20 intermediate their ends, as shown in Figs. 1, 9 and 10. This structure may comprise a single panel member 76 formed to constitute the back and sides of the structure and a sheet metal panel 77 (See Fig. 9) suitably flanged and beaded to form the seat proper as well as the front of the seat structure. The member 77 is flanged, as shown at 72, to afford a concealed, rigid attachment to the back portion of the member 76 and may also have flanges 73 which may be rigidly secured to the side portions of the seat member 76. The bottom of the seat panel 77 is also flanged, as shown at 74, to constitute a transverse reinforcing means for the side chassis members 20 and may be attached to the top flanges of the members 20 and to transversely extending gussets or brackets 75, the latter being rigidly secured to the vertical web portions of the chassis bars 20 as shown in Figs. 9 and 10.

A dump body 80 is shown in Fig. 1 as being mounted upon the rear portions of the chassis bars 20. Any suitable pivotal connecting means may serve to support the body. In Fig. 1 I show upwardly extending bracket members 82 (see Fig. 6) having the upper ends thereof perforated to receive pivot pins 83. The pivot pins engage longitudinal reinforcing members 84 secured to the underside of the dump body, and these members carry offset bracket members 85 which support the outer ends of the pin members 83, thus affording a double bearing support for the pin members 83. The usual tail gate 88 may be provided on the outer end of the dump body.

A dumping mechanism may also be provided which may comprise a manually operated lever 90 secured to a transversely extruding shaft 108 supported by suitable brackets carried by the chassis members 20 immediately adjacent the rearward portion of the seat structure. The shaft operates arms 109 which are rigid therewith and the arms operate rods 91 flexibly connected to brackets 92 which are secured to the side walls of the dump body immediately over the pivotal connections between the chassis structure and the dump body whereby only a small amount of manual effort on the lever 90 will tilt the body. A notched plate 94 may be secured to the chassis structure and form a locking means for maintaining the dump body in a normal carrying position, the lever 90 being provided with the usual lock rod for this purpose.

By way of furthering the appearance of the vehicle to that of a commercial truck, I provide splash panels 98 extending along the sides of the chassis bars 20 which may be secured thereto in any suitable manner along the top flanges thereof with the lower margins attached to metallic running board structures suspended from the side bar members 20. Suitable brackets 100 serve to support the running boards, and stabilizing brackets 101, which may be partly concealed by the splash panels 98, afford an additional supporting means for the running boards. The forward wheel guards 102 of the usual form may be mounted on brackets 103 rigidly secured to the hood and chassis structure with the rear lower ends 103ᵃ thereof secured to the running board structure in any suitable manner.

From the foregoing description of my invention it will be apparent that I provide a toy vehicle construction which may resemble in considerable detail a large commercial truck of well known make and which may be completely formed of pressed steel parts. The particular shapes of the various members constituting the chassis and body are of such as to afford a maximum strength per minimum weight. The hood and cowl are constructed in such manner as to constitute a part of the chassis structure to which the axles of the vehicle are attached by rigid brackets. The foregoing constructive features afford a considerable open space between the cowl and seat structure to permit the propulsion of the vehicle by a pedal operated means suspended beneath the body structure. If desired the vehicle may be provided with an axle spring mounting of the quarter elliptic type or a full spring mounting such as I have described and claimed in my prior application on a vehicle Ser. No. 641,616 may be embodied in my present invention in substitution for the rigid axle brackets herein disclosed.

Having thus described my invention, I claim:

1. In a toy vehicle, the combination of a chassis structure comprising elongated side frame members having portions extending in planes disposed at an angle to each other, front and rear axle brackets secured to the side frame members, axle members rigidly secured to the bracket members, a hood structure including a cowl formation, the hood structure comprising a transverse connecting means between the forward portions of said side frame members and thereby constituting a part of the chassis structure, a seat structure mounted upon said side frame members and attached thereto at two of said portions of each member and thereby constituting a transverse bracing means therebetween intermediate the forward and rearward ends of said side frame members.

2. In a toy vehicle of the character described, the combination of a chassis structure comprising two spaced apart longitudinally extending pressed steel frame members each having a body and flange portion, a metallic hood and cowl structure rigidly secured to the forward ends of said members and constituting a lateral bracing and connecting means therefor, a pressed metal seat structure secured to said side frame members, the seat structure being spaced from the cowl structure whereby an opening through the chassis structure is provided, the seat structure being secured to both the body and flange of said longitudinal members to afford therefor a lateral bracing.

3. In a toy vehicle, the combination of a chassis structure comprising side frame members, a hood structure including a cowl formation, the hood structure comprising a transverse connecting means between the forward portions of said side frame members thereby constituting a part of the chassis structure, a seat structure comprising flanged pressed members mounted upon said side frame members and constituting a transverse bracing means therebetween intermediate the forward and rearward ends of said side frame members.

4. In a toy vehicle of the character described, the combination of a chassis structure comprising two spaced apart longitudinally extending frame members each having a body and a laterally extending flange, a hood and cowl structure rigidly secured to the forward ends of said members and constituting a lateral bracing and connecting means therefor, and a seat structure secured to said side frame members at both the webs and flanges thereof, the seat structure being spaced from the cowl structure whereby an opening through the chassis structure is provided, the seat structure being secured to said longitudinal members in a rigid manner to afford therefor a lateral bracing.

5. In combination in a toy vehicle, a chassis frame structure comprising side frame members, a hood structure including a cowl formation rigidly secured to and comprising a part of the chassis structure, a seat structure spaced from the cowl structure, whereby the body of the vehicle is open between the side frame members, the cowl structure and the seat structure comprising transverse struts for the side frame members intermediate the ends thereof, the hood structure comprising a single sheet metal member forming the top and sides of the hood, and a front panel member flanged inwardly with the flanges thereof permanently secured to the top and sides of said hood member.

6. In the body structure of a vehicle of the character described, the combination of side bar members comprising a chassis, a hood and cowl structure forming the front of the body and permanently secured to the forward ends of said side members to comprise a front lateral bracing means therefor, a seat structure having a bottom portion thereof flanged and secured to said side frame members to constitute a lateral strut intermediate the ends of said side frame members, a forward strut extending between said side framing members immediately beneath the front of the hood, a transverse strut connecting the rear ends of said side members, a transverse panel member extending beneath the cowl structure immediately adjacent the rear top margin thereof, a bracket disposed beneath the hood structure and connecting the side frame members to comprise a transverse bracing means therefor and a pedal operated means for propelling the vehicle and oscillating means suspended from the bracket for driving the vehicle.

7. In a vehicle of the character described, the combination of a chassis sub-structure comprising channel shaped longitudinal extending metallic members laterally braced at the extreme forward and rearward ends thereof, struts comprising said bracing means and a hood and cowl structure including a forward panel member disposed to lie immediately above said front strut and a single member comprising the top and sides of the hood, said member being formed of pressed metal and extending downwardly and over the sides of said channel shaped members and rigidly secured thereto.

8. In a vehicle of the character described, the combination of a chassis comprising channel shaped metallic members extending longitudinally of the vehicle and spaced apart a distance substantially equal to the width of the body of the vehicle, bracing means in the form of struts secured to the forward and rearward ends thereof, a hood and cowl structure surmounting the forward ends of said chassis structure and rigidly secured thereto, and a seat structure spanning the side members, the said structure comprising pressed metal panels assembled in boxlike form and flanged at the bottom whereby the seat structure may be rigidly secured to the side members and constitute an intermediate transverse bracing means therefor.

9. A toy vehicle, having a chassis frame structure comprising side frame members formed by metallic channels, a hood structure including a cowl formation rigidly secured to the chassis structure, a seat structure spaced from the cowl structure, whereby the body of the vehicle is open between the side frame members, the hood structure comprising a single member forming the top and sides thereof, and a front panel member flanged inwardly with the flanges thereof, permanently secured to the top and sides of said hood member.

10. In a body structure of a vehicle of the character described, the combination of side channel members comprising a chassis, a hood and cowl structure forming the front of the body and permanently secured to and overlapping the side members, a seat structure having a bottom portion thereof flanged and secured to said side frame members to constitute a lateral strut intermediate the ends thereof, a forward strut extending between said side frame members immediately beneath the front of the hood, a transverse strut connecting the rear ends of said side members, a transverse panel member extending beneath the cowl structure immediately adjacent the rear top margin thereof, a bracket disposed beneath the hood structure and connecting the side frame members to comprise a transverse bracing means therefor and a steering post mounted on said bracket and said transverse panel members.

11. In a vehicle of the character described, the combination of a chassis sub-structure comprising channel shaped longitudinal extending metallic members laterally braced at the extreme forward and rearward ends thereof, struts comprising said bracing means, a hood and cowl structure including a forward panel member disposed to lie above said front strut and a main member comprising the top and sides of the hood, said member being formed of pressed metal and extending downwardly along the sides of said channel shaped members and rigidly secured thereto and the cowl comprising a pressed metal member permanently attached to the said main hood member.

12. In a vehicle of the character described, the combination of a chassis comprising channel shaped metallic members extending longitudinally of the vehicle and spaced apart a distance substantially equal to the width of the body of the vehicle, bracing means in the form of struts secured to the forward and rearward ends thereof, the struts being flanged and said flanges being secured to the flanges of the channels, a hood and cowl structure surmounting the forward end of said chassis structure and comprising two arch shaped members attached to each other and to the sides of the channel members.

13. In a vehicle of the character described, the combination of a chassis comprising channel shaped metallic members extending longitudinally of the vehicle and spaced apart a distance substantially equal to the width of the body of the vehicle, a hood and cowl structure surmounting the forward ends of the chassis structure and rigidly secured thereto, the said structure including a pressed metal panel overlapping the channel webs at the bottom and constituting an intermediate transverse bracing means for the channel shaped members.

In testimony whereof, I hereunto affix my signature.

JAMES M. HOWE.